UNITED STATES PATENT OFFICE 2,383,472

PROCESS FOR PREPARING STEROIDAL HORMONES

Harry Means Crooks, Jr., Detroit, and Eldon M. Jones, Grosse Pointe Woods, Mich., assignors to Parke, Davis & Company, Detroit, Mich., a corporation of Michigan No Drawing. Application July 5, 1944,
Serial No. 543,612

11 Claims. (Cl. 260—397.3)

This invention relates to a new process for preparing 20-keto-pregnane compounds from steroidal sapogenins or derivatives thereof. More particularly, it relates to the conversion of sapogenin derivatives having the structure

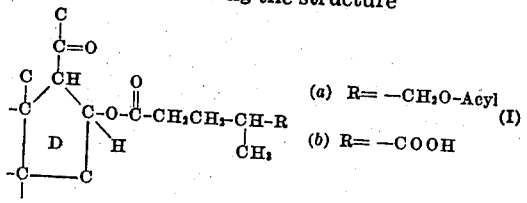

at ring D of the steroid nucleus into compounds having the structure

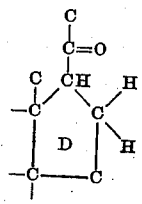

Compounds having the structure (I) may be obtained by mild oxidation of the class of compounds known as "pseudo"-sapogenins such as "pseudo"-sarsasapogenin or its lower aliphatic carboxylic acid acyl derivatives, "pseudo"-diosgenin or its acyl derivatives, "pseudo"-diosgenone or other 3-ketonic "pseudo"-sapogenin (J. A. C. S. 61, 3592; 62, 521, 648, 2525; 63, 774; 64, 1655). In addition to the "pseudo"-sapogenins, certain oxygenated sapogenins, for example kappogenin [J. A. C. S. 65, 1206 (1943)] or a suitable derivative thereof, may be directly oxidized to obtain a 16-acyloxy-20-keto pregnane derivative. We have found that if one treats a compound having the structure (I) with suitable hydrogenolytic agents one obtains as a product of the reaction a compound having the structure (II) carrying hydrogen at position 16 in place of the acyloxy group,

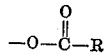

Suitable hydrogenolytic agents for carrying out this process comprises the more active metals of groups 2 and 3 of the periodic system, namely, zinc, magnesium and aluminum, in the presence of a suitable weakly alkaline or weakly acidic compound or solvent, such as aqueous alcoholic alkali bicarbonate solution, a lower fatty acid such as acetic acid, especially in the presence of halide ion or other medium wherein the metal evidences a mild reducing action.

The utility of this invention lies in the fact that, by a single step, compounds of type (I) may be converted to type (II), whereas it has been the practice to first hydrolyze a type (I) compound thereby obtaining a 16,17 unsaturated 20-ketone and then in a second stage to selectively reduce the $\Delta^{16}$-double bond to obtain a type (II) compound [cf. J. A. C. S. 62, 3350 (1940)] The method of the present invention involves reduction of a ring D oxidized function without affecting double bonds in the other steroid rings. Hence, it is particularly advantageous in such cases as involve a structure in the other steroid rings which might also be susceptible to reduction.

The practice of the invention may be illustrated by the following examples, which are included for purposes of illustration only, and the scope of the invention is not necessarily limited thereto.

Example 1

A solution of 25 grams of pseudo-diosgenin diacetate in 500 cc. of glacial acetic acid is allowed to react at room temperature (between 20 and 35° C.) with a solution of 12.5 gms. of chromium trioxide in 125 cc. of 60% acetic acid for a period of 1½ hours. At the end of this period, three grams of zinc bromide and thirty grams of zinc dust are added to the solution, the temperature rising to about 65° C. and the solution heated on the steam bath for 1 hour additional. At the end of this time, the solid excess zinc is filtered from the solution, the clear filtrate evaporated essentially to dryness and the residue taken up in about 1 liter of ether. The ether solution is washed free of acids and salts with water and a 5% solution of sodium carbonate or other dilute alkali. The neutral ether solution is dried and then evaporated to dryness. The residue may be crystallized from acetone or methanol to give essentially pure $\Delta^5$-pregnen-3$\beta$ol-20-one acetate, M. P. 147–9° C.

Example 2

Pseudo-diosgenin diacetate is oxidized in the same manner as in Example 1. The excess oxidizing agent is destroyed by addition of a solution of sodium sulfite, the reaction mixture diluted with three volumes of water and extracted with ether. The ether extract is washed free of salts and of acids with water and with dilute alkali solution and the dried, neutral ether solution evaporated to dryness. The residue, having structure (Ia) at ring D, where the acyl group is the acetate radical, is dissolved in 600 cc. of ethanol. 300 cc. of a 10% solution of potassium bicarbonate in water is then added, as well as 25 gms. of powdered zinc. The mixture is refluxed for 3 hours, filtered to remove excess zinc, the filtrate made faintly acid with mineral acid and finally diluted to four volumes with water. The precipitated solid is collected and crystallized to yield essentially pure Δ⁵-pregnen-3β-ol-20-one, M. P. 191° C.

Example 3

Twenty grams of pseudo-diosgenone-3 is dissolved in 400 cc. of glacial acetic acid and a solution of 17.5 gm. of chromium trioxide in 175 cc. of 60% acetic acid is added while maintaining the temperature below 40° C. After the oxidation has continued for 1¼ hours, a solution of 2 gm. of zinc chloride in 20 cc. of 50% acetic acid is added as well as 15 gm. of powdered zinc. The mixture is heated on the steam bath for 1 hour, and then worked up as in Example 1. Evaporation of the dry, neutral ether solution resulting gives an oily residue which on crystallization from suitable solvent, such as ether, ligroin, aqueous acetone or aqueous methanol, gives crystalline progesterone, M. P. 128° C.

The transformations of this example may be illustrated as follows:

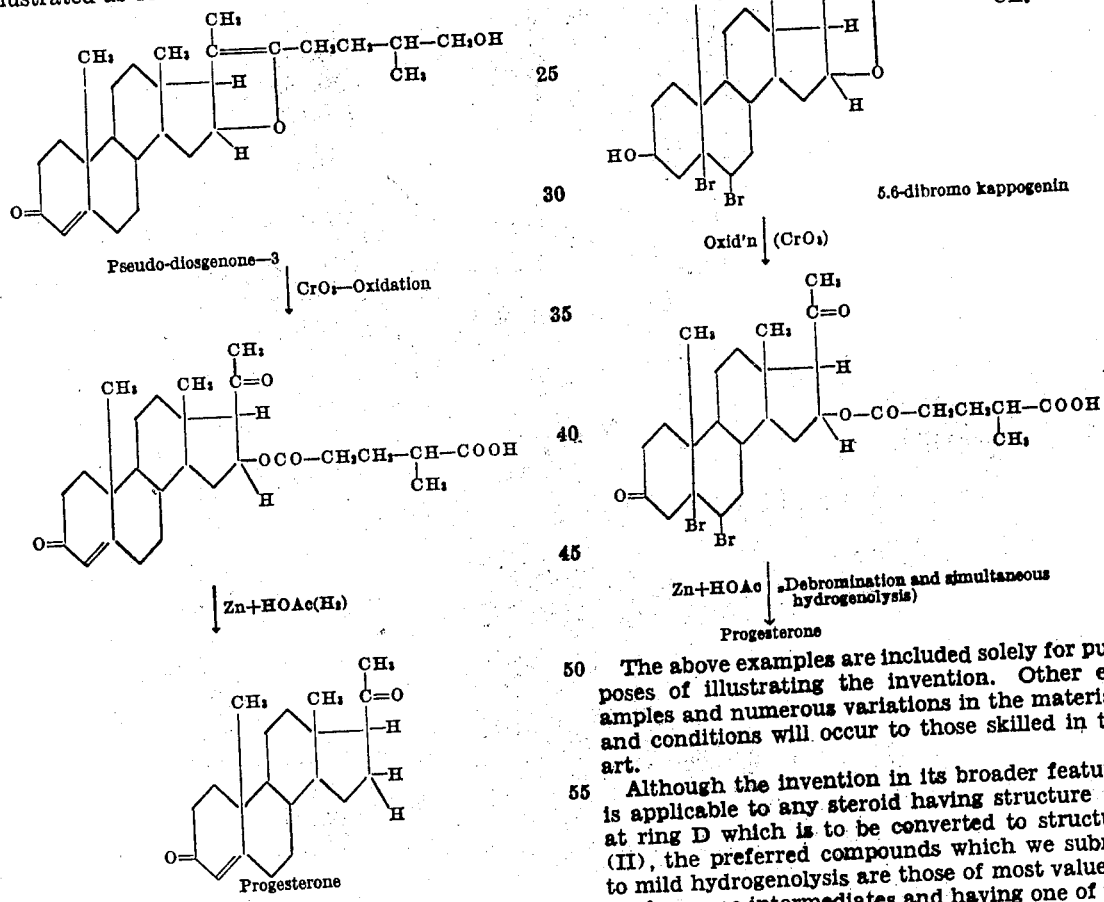

Example 4

Ten grams of kappogenin (0.0233 moles) is dissolved in 200 cc. of glacial acetic acid and to the solution there is added 23.3 cc. of a 1 molar solution of bromine in acetic acid. To this solution is now added a solution of ten grams of chromic oxide in 100 cc. of 60% acetic acid, maintaining the temperature below 40° C. After 1½ hours oxidation, ten grams of zinc dust is added to the solution and the mixture heated with stirring on the steam bath for 1 hour. The excess zinc is filtered from the solution and the filtrate worked up as was done with the filtrate from excess zinc in Example 1. Evaporation of the resulting neutral ether solution (after drying) leaves a gummy residue which on crystallization from a suitable solvent gives crystalline progesterone, M. P. 128° C.

The transformations of this example may be illustrated as follows:

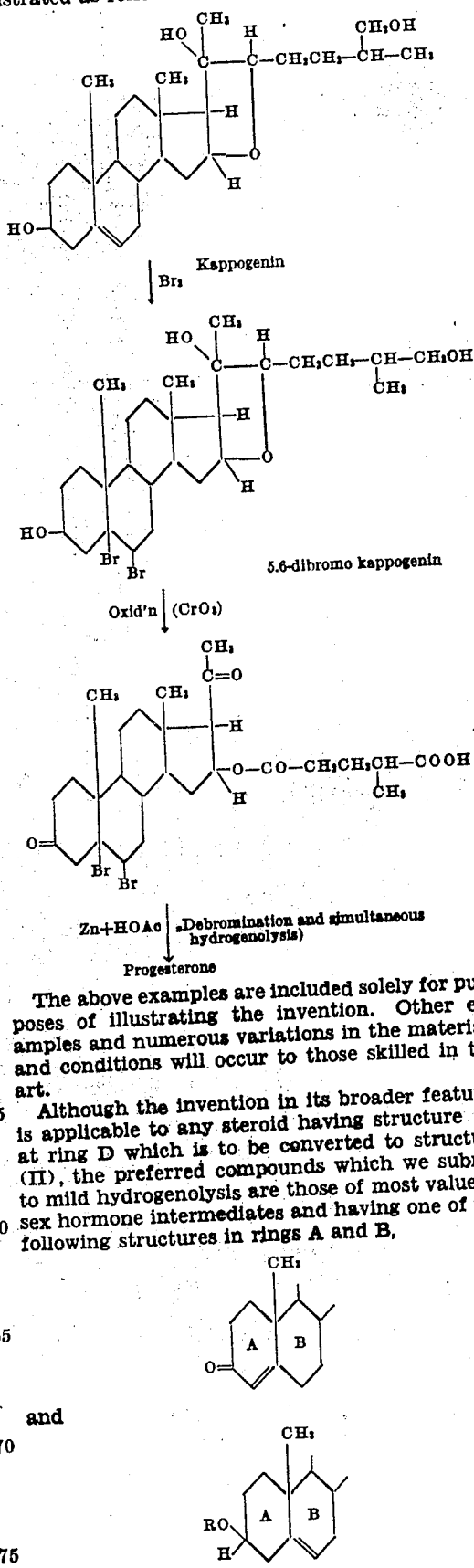

The above examples are included solely for purposes of illustrating the invention. Other examples and numerous variations in the materials and conditions will occur to those skilled in the art.

Although the invention in its broader features is applicable to any steroid having structure (I) at ring D which is to be converted to structure (II), the preferred compounds which we submit to mild hydrogenolysis are those of most value as sex hormone intermediates and having one of the following structures in rings A and B,

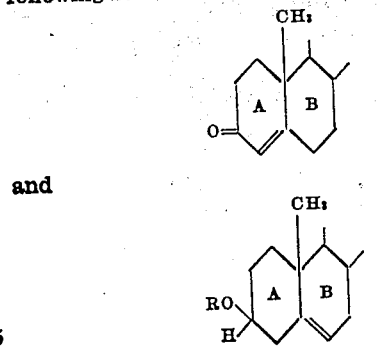

and where R is hydrogen or organic carboxylic acid acyl group, such as acetyl, benzoyl, etc.

What we claim as our invention is:

1. The process for converting a steroid ester having at ring D the structure,

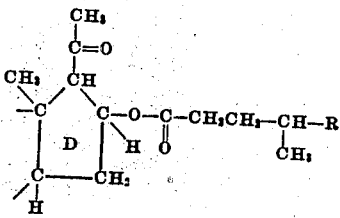

into a steroid derivative having at ring D the structure,

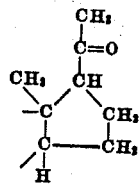

which comprises treating said ester with a metal of the class consisting of zinc, magnesium and aluminum in the presence of a compound of the class consisting of weakly alkaline and weakly acidic compounds capable of liberating nascent hydrogen from said metal, R of the formula being a radical of the class consisting of —CH₂OAcyl and —COOH.

2. The process for converting a steroid ester having at ring D the structure,

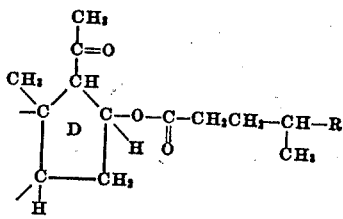

into a steroid derivative having at ring D the structure,

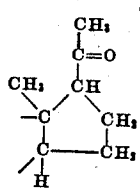

which comprises treating said ester with zinc in the presence of a compound of the class consisting of weakly alkaline and weakly acidic compounds capable of liberating nascent hydrogen from said metal, R of the formula being a radical of the class consisting of —CH₂OAcyl and —COOH.

3. The process for converting a steroid ester having at ring D the structure,

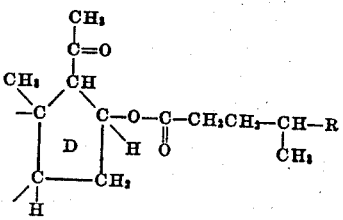

into a steroid derivative having at ring D the structure,

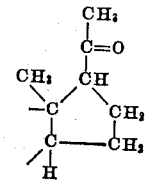

said ester and also its derivative having in rings A and B one of the structures,

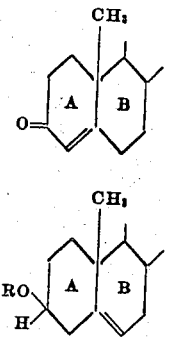

and which comprises treating said ester with a metal of the class consisting of zinc, magnesium and aluminum in the presence of a compound of the class consisting of weakly alkaline and weakly acidic compounds capable of liberating nascent hydrogen from said metal, R of the formula being a radical of the class consisting of —CH₂OAcyl and —COOH.

4. The process for converting a steroid ester having at ring D the structure,

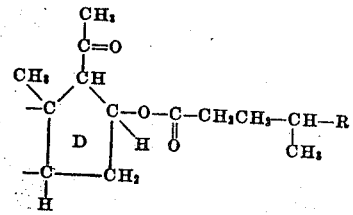

into a steroid derivative having at ring D the structure,

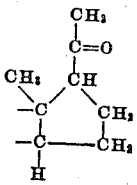

said ester and also its derivative having in rings A and B one of the structures,

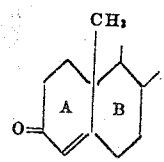

and

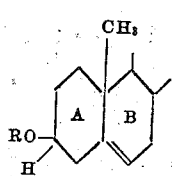

which comprises treating said ester with a metal of the class consisting of zinc, magnesium and aluminum in the presence of a lower fatty acid capable of liberating nascent hydrogen from said metal, R of the formula being a radical of the class consisting of —CH₂OAcyl and —COOH.

5. Process for replacing by hydrogen the C-16 ester group,

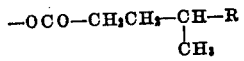

of a C-16 ester of a compound of the class consisting of 16-hydroxy-Δ⁴-pregnenone-3,16-hydroxy-Δ⁵-pregnenol-3 and C-3 carboxylic acid esters of said 16-hydroxy-Δ⁵-pregnenol-3, which comprises treating said C-16 ester with a metal of the class consisting of zinc, magnesium and aluminum in the presence of a compound of the class consisting of weakly alkaline and weakly acidic compounds capable of liberating nascent hydrogen from said metal, R of the C-16 ester group being a radical of the class consisting of —CH₂OAcyl and —COOH.

6. Process for replacing by hydrogen the C-16 ester group of a 16-hydroxy-Δ⁴-pregnenone-3 ester having at ring D the structure,

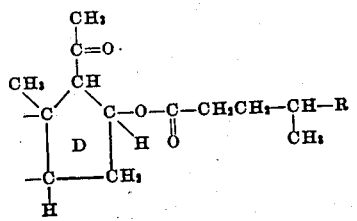

which comprises treating said C-16 ester with a metal of the class consisting of zinc, magnesium and aluminum in the presence of a compound of the class consisting of weakly alkaline and weakly acidic compounds capable of liberating nascent hydrogen from said metal, R of the C-16 ester group being a radical of the class consisting of —CH₂OAcyl and —COOH.

7. Process for replacing by hydrogen the C-16 ester group of a 16-hydroxy-Δ⁴-pregnenone-3 ester having at ring D the structure,

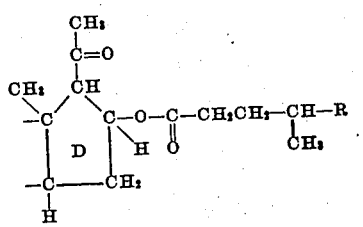

which comprises treating said ester with a metal of the class consisting of zinc, magnesium and aluminum in the presence of a lower fatty acid capable of liberating nascent hydrogen from said metal, R of the formula being a radical of the class consisting of —CH₂OAcyl and —COOH.

8. Process for obtaining progesterone from a C-16 ester of 16-hydroxy-Δ⁴-pregnenone-3 of formula

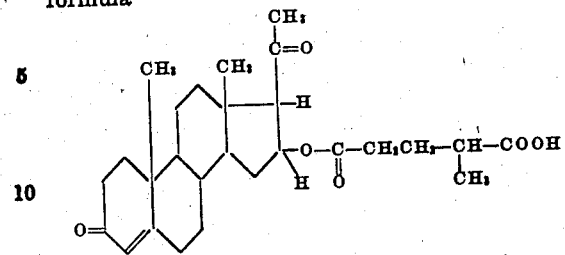

which comprises treating said ester with zinc and lower fatty acid.

9. Process for obtaining progesterone which comprises treating an ester of 16-hydroxy-5,6-dibromo-pregnandione-3,20 of formula,

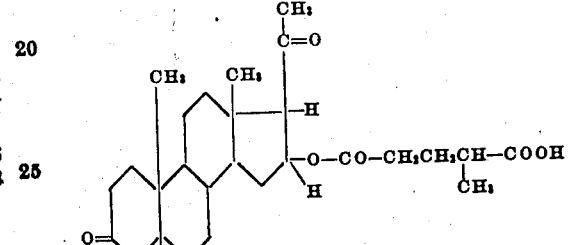

with zinc and lower fatty acid.

10. Process for obtaining progesterone from a C-16 ester of 16-hydroxy-Δ⁴-pregnenone-3 of formula

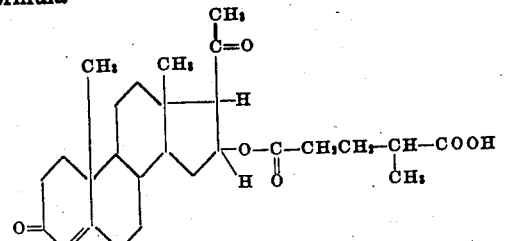

which comprises treating said ester with zinc and acetic acid.

11. Process for obtaining progesterone which comprises treating an ester of 16-hydroxy-5,6-dibromo-pregnandione-3,20 of formula,

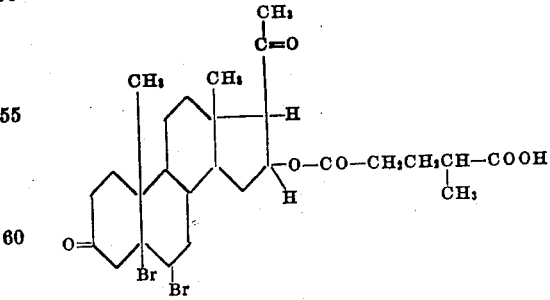

with zinc and acetic acid.

HARRY MEANS CROOKS, Jr.
ELDON M. JONES.